(12) United States Patent
Reed et al.

(10) Patent No.: US 9,996,580 B2
(45) Date of Patent: Jun. 12, 2018

(54) SYSTEM, METHOD, AND COMPUTER-READABLE MEDIUM FOR COSTING USER-DEFINED FUNCTIONS AND METHODS IN A DATABASE MANAGEMENT SYSTEM

(75) Inventors: Michael Reed, San Diego, CA (US); Elizabeth Brealey, San Diego, CA (US); Kevin Virgil, Oceanside, CA (US)

(73) Assignee: Teradata US, Inc., Dayton, OH (US)

( * ) Notice: Subject to any disclaimer, the term of this patent is extended or adjusted under 35 U.S.C. 154(b) by 681 days.

(21) Appl. No.: 12/269,085

(22) Filed: Nov. 12, 2008

(65) Prior Publication Data

US 2010/0121863 A1    May 13, 2010

(51) Int. Cl.
*G06F 17/30* (2006.01)

(52) U.S. Cl.
CPC .. *G06F 17/30442* (2013.01); *G06F 17/30463* (2013.01); *G06F 17/30749* (2013.01); *G06F 17/30867* (2013.01); *G06F 17/30905* (2013.01)

(58) Field of Classification Search
CPC ......... G06F 17/30867; G06F 17/30905; G06F 17/30463; G06F 17/30749; G06F 17/30761; G06F 17/30442; G06F 17/30474; G06F 17/30035; G06F 17/30433; G06F 17/30469; G06F 17/30477; G06F 2209/483; G06F 9/505; G06F 17/30306
USPC ......................................... 707/720, 792, 704
See application file for complete search history.

(56) References Cited

U.S. PATENT DOCUMENTS

| | | | |
|---|---|---|---|
| 7,158,929 B2 * | 1/2007 | Wouters et al. ................. 703/24 |
| 7,743,051 B1 * | 6/2010 | Kashyap ........... G06F 17/30545 |
| | | | 707/713 |
| 2007/0050328 A1 * | 3/2007 | Li ..................... G06F 17/30967 |
| | | | 707/716 |
| 2008/0177756 A1 * | 7/2008 | Kosche et al. ................ 707/100 |
| 2009/0063396 A1 * | 3/2009 | Gangarapu ....... G06F 17/30321 |
| | | | 707/716 |
| 2009/0327216 A1 * | 12/2009 | Brown ............. G06F 17/30474 |
| | | | 707/716 |

* cited by examiner

*Primary Examiner* — Shahid Alam
(74) *Attorney, Agent, or Firm* — Steven McDonald; Randy L. Campbell, Jr.

(57) ABSTRACT

A system, method, and computer-readable medium for the calculation of execution time estimates of user defined functions/user defined methods are provided. The execution of a UDF or UDM is timed several times at the time of the UDF/UDM creation, and an average execution time of the UDF/UDM is obtained. The resulting average execution time is then stored in a data dictionary where the optimizer may consult this value to factor it into the cost of execution of a query.

20 Claims, 5 Drawing Sheets

SYSTEM, METHOD, AND COMPUTER-READABLE MEDIUM FOR COSTING USER-DEFINED FUNCTIONS AND METHODS IN A DATABASE MANAGEMENT SYSTEM

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

Database architects utilize extensibility features to add functionality to the database and to move more analytical processing inside of the database for better control and performance. Mechanisms for achieving these goals include User Defined Functions (UDFs) and User Defined Methods (UDM) and types. However, contemporary database systems do not assign a true cost to the execution of a user defined function or user defined method. Disadvantageously, the time estimates for running an SQL command often do not accurately reflect the time or resources necessary to execute operations that involve UDFs or UDMs.

SUMMARY

Disclosed embodiments provide a system, method, and computer readable medium for calculation of execution time estimates of UDFs/UDMs. In one implementation, the execution of a UDF or UDM is timed several times at the time of the UDF/UDM creation, and an average execution time of the UDF/UDM is obtained. The resulting average execution time is then stored in the data dictionary where the optimizer may consult this value to factor it into the cost of execution of a query. In an embodiment, the main body of UDFs/UDMs may check a UDF/UDM cost estimate flag and invoke the timing routine accordingly. For example, if the cost estimate flag is set to true, the UDF/UDM may then allocate the input parameters to facilitate the cost estimate timing routine. The input parameters or variables may then be set to valid values. To this end, one or more value sets for the UDF/UDM may be stored in a values database that are indexed or otherwise associated with the UDF/UDM and that are retrievable for testing of the UDF/UDM. The UDF/UDM may then obtain a start timestamp or invoke a timer and subsequently invoke the UDF/UDM for execution thereof with the parameters set to the test value set. Upon completion of execution of the UDF/UDM, the UDF/UDM may then obtain an end timestamp or terminate the timer and thereafter calculate an execution time. Such a procedure may be repeated, and an average execution time may be calculated from multiple execution times calculated for the UDF/UDM. The average execution time may then be written to the data dictionary.

Advantageously, the UDF/UDM costing calculations are automatically made available to a cost estimation subsystem of the optimizer via the data dictionary. Further, the timing mechanism is self contained in the UDF/UDM code. Still further, the UDF/UDM execution time calculation routine does not require the database administrator to gather statistics or otherwise attempt to calculate estimated execution costs.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, mechanisms for the calculation of execution time estimates of UDFs/UDMs are provided. In one implementation, the execution of a UDF or UDM is timed several times at the time of the UDF/UDM creation, and an average execution time of the UDF/UDM is obtained. The resulting average execution time is then stored in the data dictionary where the optimizer may consult this value to factor it into the cost of execution of a query. Particularly, the main body of a UDF/UDM may check a UDF/UDM cost estimate flag and invoke the timing routine accordingly. Input parameters or variables may then be set to valid values. The UDF/UDM may then obtain a start time stamp or invoke a timer and subsequently invoke the UDF/UDM for execution thereof with the parameters set to the test value set. Upon completion of execution of the UDF/UDM, the UDF/UDM may then obtain an end timestamp or terminate the timer and thereafter calculate an execution time. Such a procedure may be repeated, and an average execution time may be calculated from the execution times obtained for the UDF/UDM. The average execution time may then be written to the data dictionary.

Figure 1:
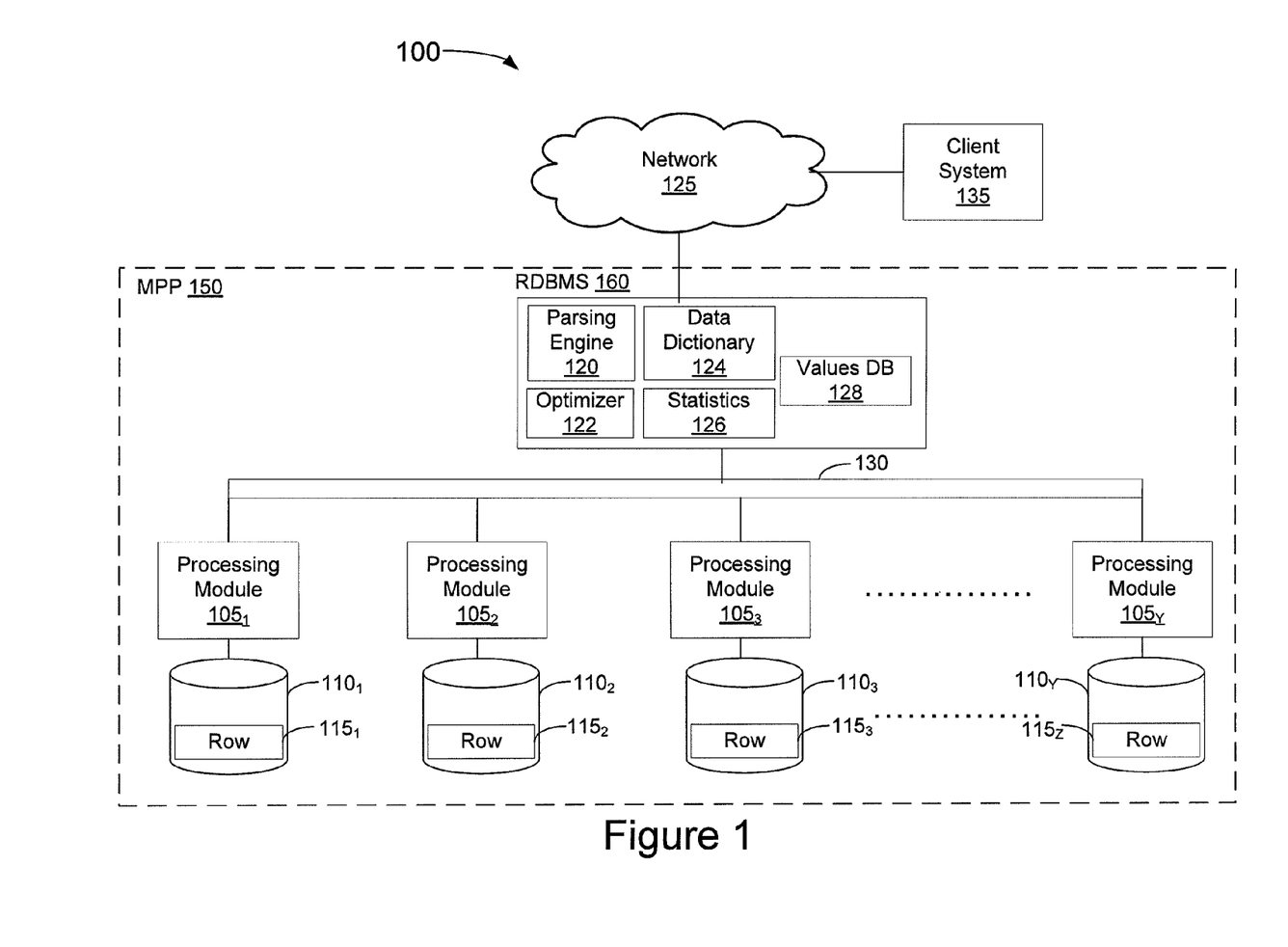
FIG. 1 depicts a diagrammatic representation of an exemplary architecture for a large database system that is suited for implementing a user defined method or user defined function execution time calculation routine in accordance with disclosed embodiments.

FIG. 1 depicts a diagrammatic representation of an exemplary architecture for a large database system 100, such as a Teradata Active Data Warehousing System, that is suited for implementing a user defined method or user defined function execution time calculation routine in accordance with disclosed embodiments. The database system 100 includes a relational database management system (RDBMS) 160 built upon a massively parallel processing (MPP) system 150. Other types of database systems, such as object-relational database management systems (ORDBMS) or those built on symmetric multi-processing (SMP) platforms, are also suited for use. The depicted and described architecture is exemplary only and is chosen to facilitate an understanding of the disclosed embodiments.

As shown, the database system 100 includes one or more processing modules $105_{1 \ldots Y}$ that manage the storage and retrieval of data in data-storage facilities $110_{1 \ldots Y}$. Each of the processing modules $105_{1 \ldots Y}$ may be one or more physical processors or each may be a virtual processor, such as an Access Module Processor (AMP), with one or more virtual processors running on one or more physical processors. For the case in which one or more virtual processors are running on a single physical processor, the single physical processor swaps between the set of virtual processors. For the case in which N virtual processors are running on an M-processor node, the node's operating system schedules the N virtual processors to run on its set of M physical processors.

Each of the processing modules $105_{1 \ldots Y}$ manages a portion of a database that is stored in corresponding data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing modules $105_{1 \ldots Y}$. The RDBMS 160 includes a parsing engine 120 that organizes the storage of data and the distribution of table rows $115_{1 \ldots Z}$ among the processing modules $105_{1 \ldots Y}$ and accesses processing modules $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network connection 125. The parsing engine 120, on receiving an incoming database query, applies an optimizer component 122 to the query to assess the best plan for execution of the query. Selecting the optimal query-execution plan includes, among other things, identifying which of the processing modules $105_{1 \ldots Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. Database statistics 126 may be used to facilitate query assessments during construction of the query-execution plan. For example, database statistics 126 may be used by the optimizer 122 to determine data demographics, such as attribute minimum and maximum values and data ranges of the database. The database system typically receives queries in a standard format, such as the Structured Query Language (SQL) put forth by the American National Standards Institute (ANSI).

Figure 2:
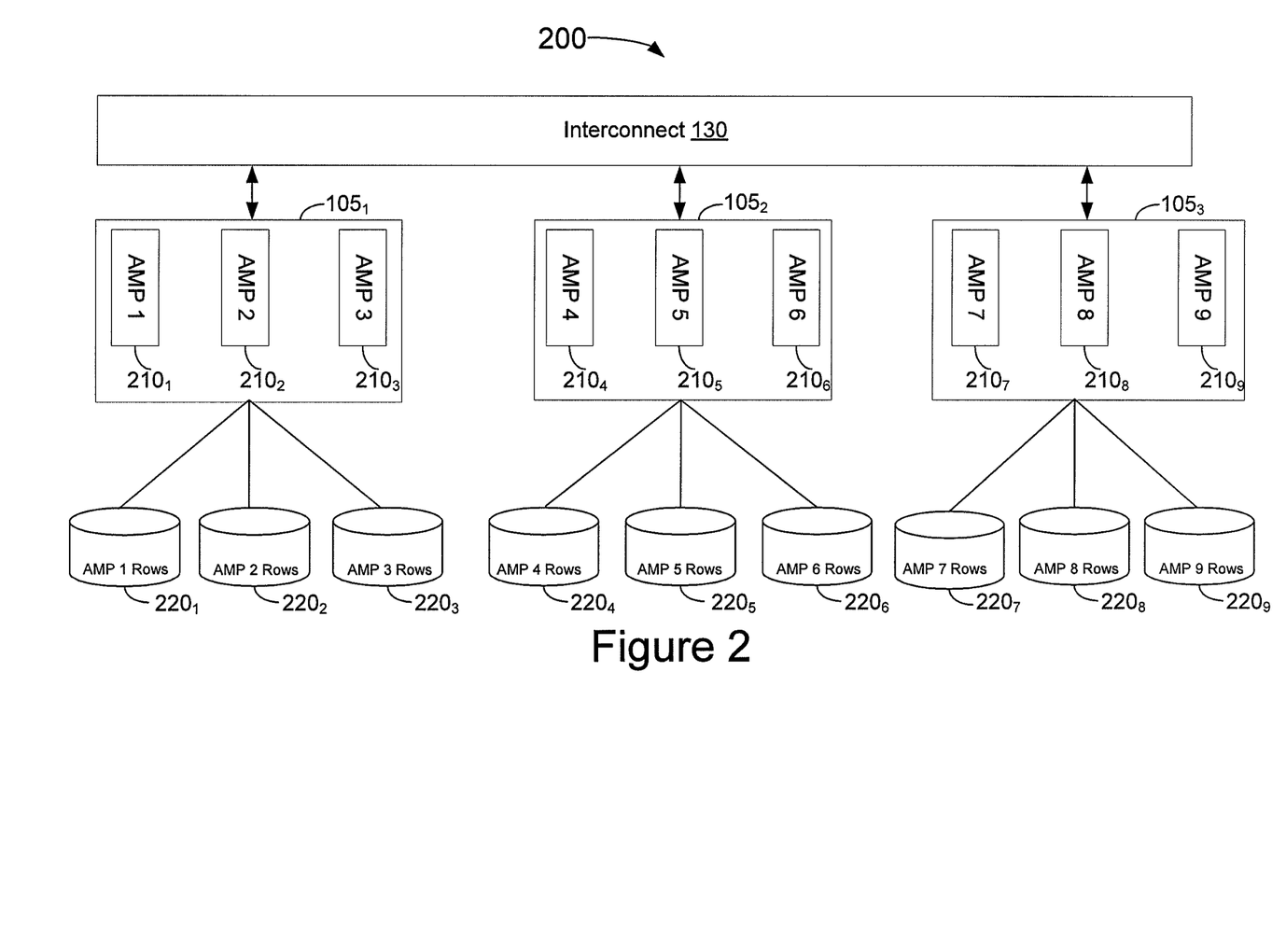
FIG. 2 is a diagrammatic representation of an massively parallel configuration suitable for implementing a user defined function or method costing mechanism implemented in accordance with disclosed embodiments.

FIG. 2 is a diagrammatic representation of an MPP configuration 200 suitable for implementing a user defined function and method costing mechanism implemented in accordance with disclosed embodiments. In the illustrative example, each of the processing modules $105_1$-$105_3$ are each configured with three respective AMPs $210_1$-$210_9$. The rows $115_{1 \ldots Z}$ of a table have been distributed across the nine AMPs $210_1$-$210_9$ hosted by processing modules $105_1$-$105_3$ such that each of the AMPs is allocated rows $220_1$-$220_9$.

Figure 3:
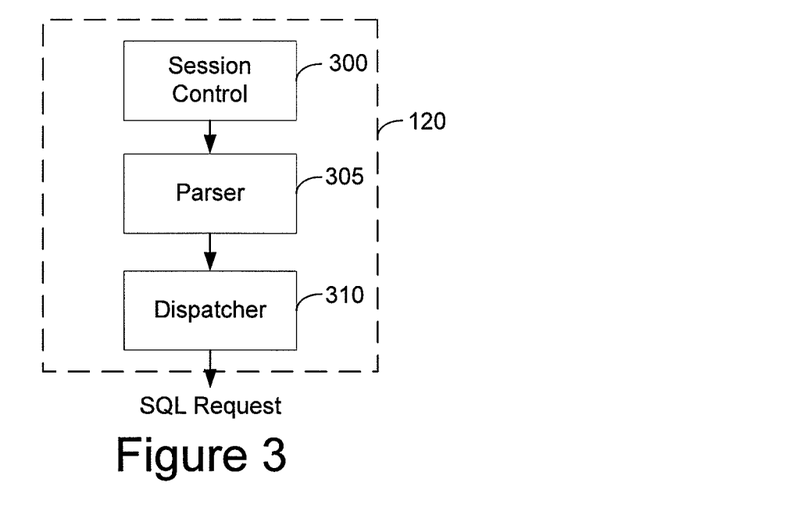
FIG. 3 is a diagrammatic representation of a parsing engine implemented in accordance with disclosed embodiments.
Figure 4:
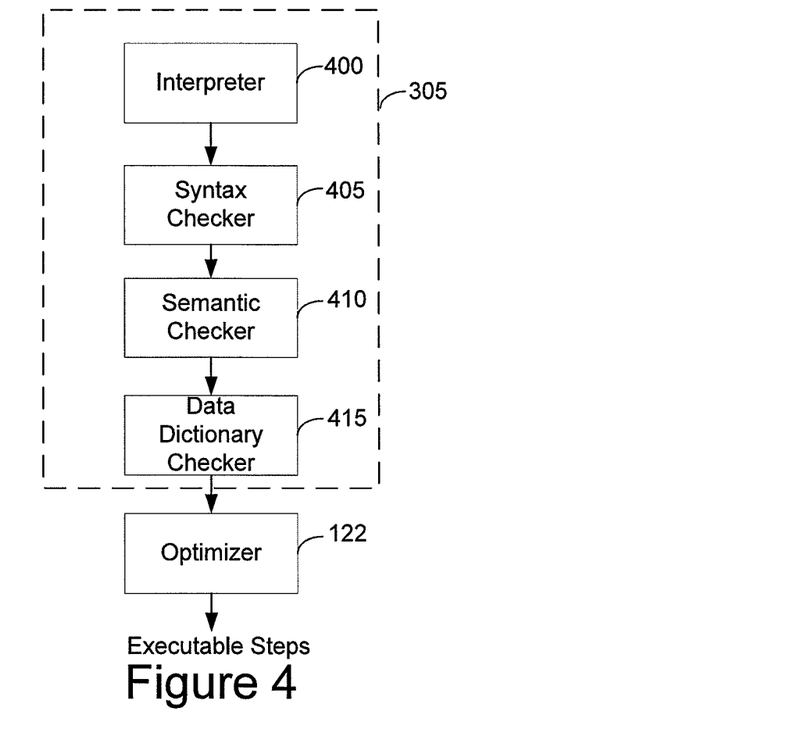
FIG. 4 depicts an exemplary parser processing routine implemented in accordance with an embodiment.

In one example system, the parsing engine 120 is made up of three components: a session control 300, a parser 305, and a dispatcher 310, as shown in FIG. 3. The session control 300 provides the logon and logoff function. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults the data dictionary 124 to ensure that all of the objects specified in the SQL request exist and that the user has the authority to perform the request (block 415). Finally, the parser 305 runs the optimizer 122 that selects the least expensive plan to perform the request.

As noted above, contemporary database systems do not assign a true cost to the execution of a user defined function or user defined method. Disadvantageously, the time estimates for running an SQL command often do not accurately reflect the time or system resources necessary to execute operations that involve UDFs or UDMs.

In accordance with disclosed embodiments, the execution of a UDF or UDM is timed several times at the time of creation, e.g., at CREATE FUNCTION/METHOD invocation, and an average execution time of the UDF or UDM is obtained. The resulting average execution time is then stored in the data dictionary 124 where the optimizer may consult this value to factor it into the cost of execution of a query. Contemporary implementations for UDFs/UDMs define how parameters are passed to a function. In addition to the parameters that are defined in the CREATE FUNCTION statement, the database defines and passes additional parameters, such as null indicator parameters, sqlstate, and error message parameters. In accordance with disclosed embodiments, the RDBMS 160 may define and pass two additional parameters to the UDF/UDM—one that directs the UDF/UDM to perform a cost estimate and one that returns the cost estimate. The parameter that requires the cost estimate may be set to true at the time of the CREATE SQL statement and may be set to false during normal function execution.

The main body of UDFs/UDMs may check a cost estimate flag and invoke the timing routine accordingly. In accordance with disclosed embodiments, when the UDF/UDM determines the cost estimate flag is set in the affirmative, the UDF/UDM may then allocate the input parameters to facilitate the cost estimate timing routine. The input parameters may then be set to valid values. To this end, one or more value sets for the UDF/UDM may optionally be stored in a values database 128 that are indexed or otherwise associated with the UDF/UDM and that are retrievable for testing of the UDF/UDM in accordance with disclosed embodiments. Alternatively, the value sets may be included in the UDF/UDM source code. The UDF/UDM may then obtain a start timestamp or invoke a timer and subsequently invoke the UDF/UDM for execution thereof with the parameters set to the test value set. Upon completion of execution of the UDF/UDM, the UDF/UDM may then obtain an end timestamp or terminate the timer and thereafter calculate an execution time. For example, the begin timestamp may be subtracted from the end timestamp to determine an execution time of the UDF/UDM. If any additional value sets remain for the UDF/UDM, the process may be repeated. When no additional value sets remain, an average execution time may be calculated from each individual execution time calculated for the UDF/UDM. The average execution time may then be returned, e.g., to the RDBMS 160, which may then write the average execution time for the UDF/UDM to the data dictionary 124.

In accordance with another embodiment, a weight metric or value may be associated with each value set on which the UDF/UDM is run. The weight may be assigned to a value set based on, for example, a type of UDF/UDM execution with which the value set is associated and stored, for example, in the values database 128. A value set representing a more frequent UDF/UDM execution may be assigned a higher weight value than another value set representing a less frequent UDF/UDM execution. In this manner, the execution time of the UDF/UDM on a particular value set may be weighted according to the weight of the value set such that the calculated average execution time of the UDF/UDM accurately reflects the frequency of the types of UDF/UDM executions.

Figure 5:
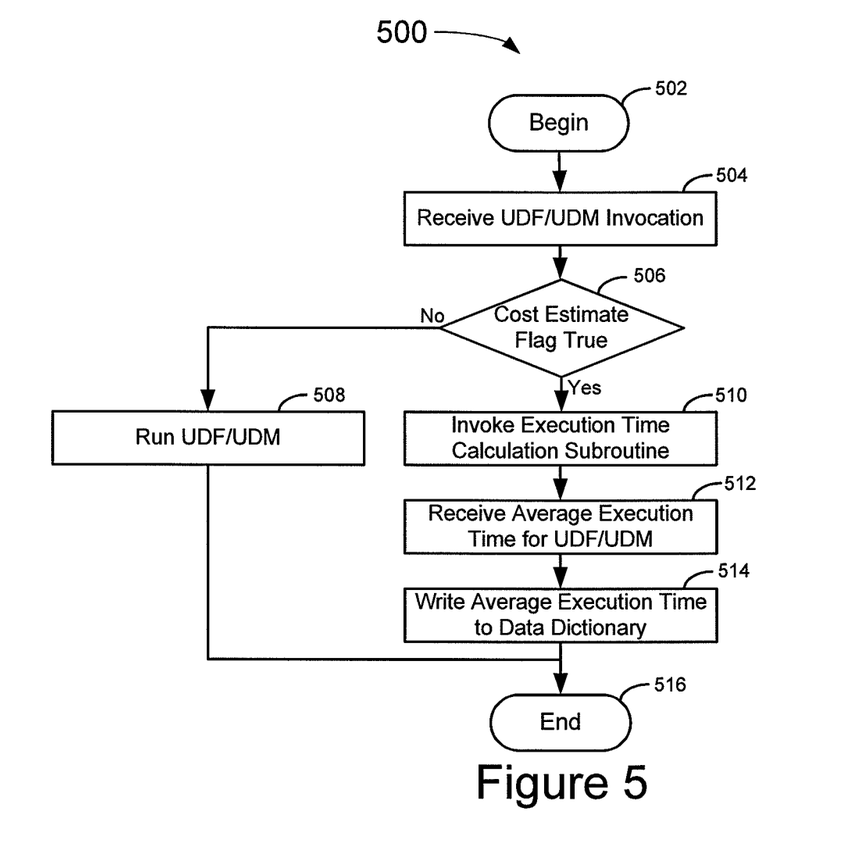
FIG. 5 is a flowchart of a user defined function/user defined method processing routine implemented in accordance with disclosed embodiments.

FIG. 5 is a flowchart 500 of a UDF/UDM processing routine implemented in accordance with disclosed embodiments. The processing steps of FIG. 5 may be implemented as computer-executable instructions tangibly embodied on a computer-readable medium executable by a processing system, such as one or more of the AMPs $210_1$-$210_9$ depicted in FIG. 2 or by a processing module executing the RDBMS 160.

The processing routine is invoked (step 502), and a UDF/UDM invocation is received (step 504). The UDF/UDM may then evaluate a cost estimate flag of the UDF/UDM (step 506). If the cost estimate flag is set to false, the UDF/UDM may then be executed (step 508), and the UDF/UDM processing routine cycle may then end (step 516).

Returning again to step 506, if the cost estimate flag is set to true, an execution time calculation subroutine may be invoked (step 510) as described more fully hereinbelow with reference to FIG. 6. An average execution time for the UDF/UDM is then received from the execution time calculation subroutine (step 512). The average execution time may then be written to the data dictionary 124 (step 514), and the UDF/UDM processing routine cycle may then end according to step 516.

Figure 6:
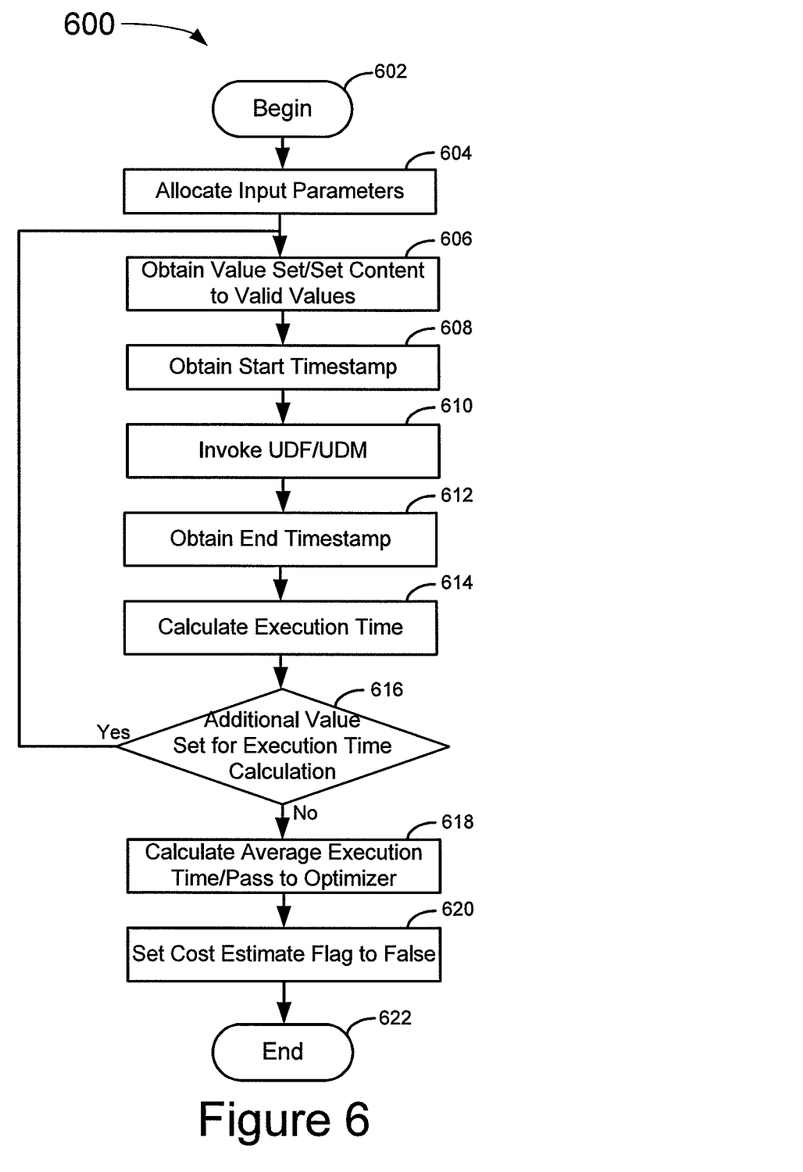
FIG. 6 is a flowchart of a user defined function/user defined method execution time calculation subroutine implemented in accordance with disclosed embodiments.

FIG. 6 is a flowchart 600 of a UDF/UDM execution time calculation subroutine implemented in accordance with disclosed embodiments. The processing steps of FIG. 6 may be implemented as computer-executable instructions tangibly embodied on a computer-readable medium executable by a processing system, such as one or more of the AMPs $210_1$-$210_9$ depicted in FIG. 2 or by a processing module executing the RDBMS 160.

The calculation subroutine is invoked (step 602), e.g., according to step 510 of FIG. 5. The UDF/UDM input parameters are allocated (step 604). A value set for the UDF/UDM is obtained, and the UDF/UDM parameters are set according to the value set (step 606). For example, the value set may be retrieved from the values database 128. A start timestamp is then obtained (step 608), and the UDF/UDM is invoked to run on the value set obtained at step 606 (step 610). When the UDF/UDM has completed execution, an end timestamp is obtained (step 612). An execution time is then calculated, e.g., by subtracting the beginning timestamp from the end time stamp (step 614). An evaluation may then be made to determine if an additional value set is available for the UDF/UDM (step 616). If another value set is available, the value set is obtained and the UDF/UDM content is set according to step 606.

When no additional value sets remain, an average execution time may then be calculated by averaging each execution time calculated for each value set on which the UDF/UDM has been run, and the average execution time may then be passed to the optimizer for writing to the data dictionary (step 618). During calculation of the average execution time, each execution time may be weighted according to a weight assigned or otherwise associated with the value set on which the execution time was obtained such that the calculated average execution time may accurately reflect the frequency of the types of UDF/UDM executions. For example, the average execution time ($T_{av}$) may be calculated according to the following:

$$T_{av} = \frac{\sum_{i=1}^{N} T_i W_i}{\sum_{i=1}^{N} W_i} \qquad \text{eq. 1}$$

where $T_i$ is an execution time calculated for a particular value set and $W_i$ is a frequency weight assigned or otherwise associated with the value set. The cost estimate flag in the UDF/UDM may then be set to false (step 620), and the execution time calculation subroutine cycle may then end (step 622).

In accordance with another embodiment, calculation of average execution times of, for example, Java UDFs and UDMs may be accommodated. In this implementation, a one-to-one correspondence is maintained between parameters of a UDF/UDM and the parameters defined in an external method signature. The MPP database system 100 may be configured to provide interaction between the internal database environment and the UDF/UDM execution environment, and vice versa, and may further be configured to provide interaction between the UDF/UDM execution environment and the user code that implements the external routine, and vice versa.

Accordingly, a Boolean flag that specifies whether a cost estimate is to be performed may be passed from the internal database environment via opcode which is created to send the message to the UDF/UDM execution environment to execute the UDF/UDM. To this end, the UDF/UDM execution environment may allocate space in a result data area to buffer a cost estimate that is to be sent back to the database environment. The UDF/UDM execution environment may save all information passed to it in the opcode such that it is accessible during execution via an FNC library, i.e., a library that provides an interface between the database environment and UDF/UDMs. The FNC library may include a do cost estimate routine that checks the opcode cost estimate flag and returns a Boolean value of the flag to indicate if the cost estimate should be performed. If the cost estimate flag indicates a cost estimate should be performed, user code that performs the cost estimation is executed. The calculated cost estimation may then be passed to a cost value FNC routine that takes the cost estimation value and passes it to a buffer, e.g., allocated in the result area space in the UDF/UDM execution environment, such that the cost estimate may be passed back to the database environment. The FNC library may be made available to a Java external method via, for example, Java classes which act as wrapper routines to the FNC environment. Thus, a Java class may be defined and used within the Java code for cost estimation.

As described, a method, computer-readable medium, and system that facilitate the calculation of execution time estimates of UDFs/UDMs are provided. In one implementation, the execution of a UDF or UDM is timed several times at the time of the UDF/UDM creation, and an average execution time of the UDF/UDM is obtained. During calculation of the average execution time, each execution time may be weighted according to a weight assigned or otherwise associated with the value set on which the execution time was obtained such that the calculated average execution time may accurately reflect the frequency of the types of UDF/UDM executions. The resulting average execution time is then stored in the data dictionary where the optimizer may consult this value to factor it into the cost of execution of a query. In an embodiment, the main body of a UDF/UDM may check a UDF/UDM cost estimate flag and invoke the timing routine accordingly. For example, if the cost estimate flag is set in the affirmative, the UDF/UDM may then allocate the input parameters to facilitate the cost estimate timing routine. The input parameters or variables may then be set to valid values. To this end, one or more value sets for the UDF/UDM may be stored in a values database that are indexed or otherwise associated with the UDF/UDM and that are retrievable for testing of the UDF/UDM. The UDF/UDM may then obtain a start time stamp or invoke a timer and subsequently invoke the UDF/UDM for execution thereof with the parameters set to the test value set. Upon completion of execution of the UDF/UDM, the UDF/UDM may then obtain an end timestamp or terminate the timer and thereafter calculate an execution time. Such a procedure may be repeated, and an average execution time may be calculated from multiple execution times calculated for the UDF/UDM. The average execution time may then be written to the data dictionary.

Advantageously, the UDF/UDM costing calculations are automatically made available to a cost estimation subsystem of the optimizer via the data dictionary. Further, the timing mechanism is self contained in the UDF/UDM code. Still further, the UDF/UDM execution time calculation routine does not require the database administrator to gather statistics or otherwise attempt to calculate estimated execution costs.

The flowcharts of FIGS. 5-6 depict process serialization to facilitate an understanding of disclosed embodiments and are not necessarily indicative of the serialization of the operations being performed. In various embodiments, the processing steps described in FIGS. 5-6 may be performed in varying order, and one or more depicted steps may be performed in parallel with other steps. Additionally, execution of some processing steps of FIGS. 5-6 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of processing a database query, the method comprising:
    obtaining a test value set of parameters of one of a user-defined function and a user-defined method, wherein the one of the user-defined function and the user-defined method is included in a database query to be performed on at least one database table of a database, wherein the one user-defined function and the user-defined method is configured to call at least one function to be executed on content of the at least one database table of a database when included in the database query, wherein the test value set comprises input values to the one of the user-defined function and the user-defined method, wherein the test value set is maintained separately from the database;
    setting parameters of the one of the user-defined function and the user-defined method according to the test value set, wherein the test value set is used exclusively to set the parameters of the one of the user-defined function and the user-defined method;

running the one of the user-function and the user-defined method based on the parameters;

calculating an execution time of the running of the one of the user-defined function and the user-defined method;

storing the execution time of the running of the one of the user-defined function and the user-defined method;

receiving the database query;

in response to receipt of the database query, creating a query response plan comprising planned execution of the one of the user-defined function and the user-defined method, wherein the stored calculated execution time of the one of the user-defined function and the user-defined method is used in the creation of to determine a cost of the query response plan; and executing the query response plan to generate a response to the database query.

2. The method of claim 1, wherein obtaining a test value set comprises reading a test value set from a test value set database maintained in a parallel processing system.

3. The method of claim 1, wherein obtaining a test value set comprises obtaining a plurality of test value sets each associated with the one of the user-function and the user-defined method, wherein setting parameters comprises setting parameters of the one of the user-defined function and the user-defined method for each of the plurality of test-value sets, and wherein running the one of the user-defined function and the user-defined method comprises running the one of the user-defined function and the user-defined method with the parameters for each of the plurality of test value sets.

4. The method of claim 3, wherein calculating an execution time comprises calculating a respective execution time for each of the plurality of test value sets.

5. The method of claim 4, further comprising:
weighting each respective execution time with a weight value associated with the test value set on which the execution time was calculated; and
calculating an average execution time based on each respective execution time.

6. The method of claim 1, further comprising:
evaluating a flag of the one of the user-defined function and the user-defined method; and
setting the flag of the one of the user-defined function and the user-defined method to false subsequent to calculating the execution time.

7. The method of claim 1, wherein storing the execution time comprises writing the execution time to a data dictionary in a database management system, wherein the execution time is associated with the one of the user-defined function and the user-defined method.

8. A non-transitory computer-readable medium having computer-executable instructions for execution by a processing system to process a database, the computer-executable instructions, when executed, cause the processing system to:
obtain a test value set of parameters of one of a user-defined function and a user-defined method, wherein the one of the user-defined function and the user-defined method is included in a database query to be performed on at least one database table of a database, wherein the one user-defined function and the user-defined method is configured to call at least one function to be executed on content of the at least one database table of a database when included in the database query, wherein the test value set is maintained separately from the database;

set parameters of the one of the user-defined function and the user-defined method according to the test value set, wherein the test value set is used exclusively to set the parameters of the one of the user-defined function and the user-defined method;

run the one of the user-defined function and the user-defined method based on the parameters;

calculate an execution time of the run of the one of the user-defined function and the user defined method;

store the execution time of the run of the one of the user-defined function and the user-defined method;

receive the database query;

in response to receipt of the database query, determine a query response plan that comprises planned execution of the one of the user-defined function and the user defined method, wherein the stored calculated execution time of the one of the user-defined function and the user-defined method is used to determine a cost of the query response plan; and execute the query response plan to generate a response to the database query.

9. The computer-readable medium of claim 8, wherein the instructions that obtain a test value set comprise instructions that, when executed, cause the processing system to read a test value set from a test value set database maintained in a parallel processing system.

10. The computer-readable medium of claim 8, wherein the instructions that obtain a test value set comprise instructions that, when executed, cause the processing system to obtain a plurality of test value sets each associated with the one of the user-defined function and the user-defined method, wherein the instructions to set parameters comprise instructions that, when executed, cause the processing system to set parameters of the one of the user-defined function and the user-defined method according to each of the plurality of test value sets, and wherein the instructions that run the one of the user-defined function and the user-defined method comprise instructions that, when executed, cause the processing system to respectively run the one of the user-defined function and the user-defined method with the parameters for each of the plurality of test value sets.

11. The computer-readable medium of claim 10, wherein the instructions that calculate an execution time comprise instructions that, when executed, cause the processing system to calculate a respective execution time for each of the plurality of test value sets.

12. The computer-readable medium of claim 11, further comprising instructions that, when executed, cause the processing system to:
weight each respective execution time with a weight value associated with the test value set on which the execution time was calculated; and
calculate an average execution time based on each respective execution time.

13. The computer-readable medium of claim 8, further comprising instructions that, when executed, cause the processing system to:
evaluate a flag of the one of the user-defined function and the user-defined method; and
set the flag of the one of the user-defined function and the user-defined method to false subsequent to calculating the execution time.

14. The computer-readable medium of claim 8, further comprising instructions that, when executed, cause the processing system to write the execution time to a data dictionary in a database management system, and wherein the execution time is associated with the one of the user-defined function and the user-defined method.

15. A database system, comprising:
a processing module; and a storage device communicatively coupled with the processing module, wherein the processing module is configured to:
receive one of a user-defined function and a user-defined method;
receive a test value set of parameters for the one of the user-defined function and the user-defined method, wherein the one of the user-defined function and the user-defined method is included in a database query to be performed on at least one database table of a database, wherein the one user-defined function and the user-defined method is configured to call at least one function to be executed on content of the at least one database table of a database when included in the database query, wherein the test value set comprises input values to the one of the user-defined function and the user-defined method, wherein the test value set is maintained separately from the database;
set parameters of the one of the user-defined function and the user-defined method according to the test value set, wherein the test value set is used exclusively to set the parameters of the one of the user-defined function and the user-defined method;
run the one of the user-defined function and the user-defined method based on the test value set;
calculate an execution time of the run of the one of the user-defined function and the user-defined method;
store the execution time in the storage device to process the database query, wherein the database query is processed based on duration of the stored calculated execution time;
generate a query response plan to the database query, wherein the query response plan comprises planned execution of the one of the user-defined function and the user-defined method, wherein the stored calculated execution time of the one of the user-defined function and the user-defined method is used in the determination of to determine a cost of the query response plan; and
execute the query response plan to generate a response to the database query.

16. The system of claim 15, wherein the system further comprises a test value set database, and wherein the processing module is further configured to obtain the test value set by reading the value set from the test value set database.

17. The system of claim 15, wherein the processing module is further configured to:
obtain a plurality of test value sets each associated with the one of the user-defined function and the user-defined method;
set parameters of the one of the user-defined function and the user-defined method for each of the plurality of test value sets; and
run the one of the user-defined function and the user-defined method with the parameters for each of the plurality of test value sets.

18. The system of claim 17, wherein the processing module is further configured to calculate an execution time for each of the plurality of test value sets.

19. The system of claim 18, wherein the processing module is further configured to:
weight each respective execution time with a weight value associated with the test value set on which the execution time was calculated; and
calculate an average execution time based on each respective execution time.

20. The system of claim 15, wherein the processing module is further configured to:
evaluate a flag of the one of the user-defined function and the user-defined method; and
set the flag of the one of the user-defined function and the user-defined method to false subsequent to calculating the execution time.

* * * * *